United States Patent
Harres

(10) Patent No.: US 7,215,216 B2
(45) Date of Patent: May 8, 2007

(54) APPARATUS AND METHODS FOR CAPACITIVELY-COUPLED DEVICE INPUT/OUTPUT

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 459 days.

(21) Appl. No.: 10/717,727

(22) Filed: Nov. 20, 2003

(65) Prior Publication Data

US 2005/0113057 A1 May 26, 2005

(51) Int. Cl.
*H01P 1/04* (2006.01)
*H01P 5/00* (2006.01)

(52) U.S. Cl. .................... 333/24 C; 333/260

(58) Field of Classification Search .......... 333/24 R, 333/24 C, 260, 261, 236, 245; 343/713, 343/816, 858
See application file for complete search history.

(56) References Cited

U.S. PATENT DOCUMENTS

| | | | |
|---|---|---|---|
| 2,621,837 A | 12/1952 | Etbauer | |
| 3,004,153 A * | 10/1961 | Alford | 370/278 |
| 3,865,291 A | 2/1975 | Tidwell | |
| 4,116,373 A | 9/1978 | Bryngelson | |
| 4,696,105 A | 9/1987 | Breya | |
| 4,988,963 A * | 1/1991 | Shirosaka et al. | 333/261 |
| 5,557,290 A * | 9/1996 | Watanabe | 343/713 |
| 6,081,430 A | 6/2000 | La Rue | |
| RE37,182 E | 5/2001 | Fasullo et al. | |
| 6,604,610 B2 | 8/2003 | Starling et al. | |
| 6,611,526 B1 | 8/2003 | Chinnaswamy et al. | |
| 6,640,272 B1 | 10/2003 | Hartwell et al. | |

\* cited by examiner

*Primary Examiner*—Dean Takaoka
(74) *Attorney, Agent, or Firm*—Lee & Hayes, PLLC

(57) ABSTRACT

Apparatus and methods for capacitively coupled device input/output are disclosed. In one embodiment, a connector module includes a first member having at least one first conductive lead disposed therein. A dielectric portion is coupled to an end portion of the at least one first conductive lead. A second member has at least one second conductive lead disposed therein. The first and second members are coupled such that respective end portions of the first and second conductive leads are operatively positioned and spaced apart by the dielectric portion. The dielectric portion is adapted to capacitively couple the respective end portions of the first and second conductive leads and to allow signals to be transmitted therethrough.

16 Claims, 3 Drawing Sheets

APPARATUS AND METHODS FOR CAPACITIVELY-COUPLED DEVICE INPUT/OUTPUT

FIELD OF THE INVENTION

The present disclosure relates to apparatus and methods for capacitively-coupled device input/output, and more specifically, to capacitively-coupled connections for off-board connections, off-module connections, and the like.

BACKGROUND OF THE INVENTION

Off-board connections (e.g. backplane connections) and off-module connections (e.g. boxface connectors on an aircraft module, or video connections on a modem PC) are typically achieved either with copper (or other metallic contacts), or with fiber optic contacts. Examples of such typical prior art connections include, for example, the plug-in connections taught by U.S. Pat. No. RE37,182 issued to Fasullo et al., the contact connections taught by U.S. Pat. No. 6,081,430 issued to La Rue, the meshed connections disclosed by U.S. Pat. No. 6,611,526 B1 issued to Chinnaswamy et al., and the cable connections taught by U.S. Pat. No. 6,640272 B1 issued to Hartwell et al.

Although desirable results have been achieved using such prior art systems, there is room for improvement. For example, for systems operating in harsh, outdoor environments, the contacts of such prior art systems may be susceptible to contamination by dust and other debris and substances. When such foreign substances become lodged between the physical contacts, the operability of the system may be adversely affected. Thus, a need exists for improved apparatus and methods for off-board and off-module connections that are less susceptible to contamination by dust and debris becoming lodged in connection modules.

SUMMARY OF THE INVENTION

The present invention is directed to apparatus and methods for capacitively-coupled device input/output, and more specifically, to capacitively-coupled connections for off-board connections, off-module connections, and the like. Apparatus and methods in accordance with the present invention may advantageously provide improved reliability and more robust performance than prior art devices, particularly in harsh operating environments.

In one embodiment, a connector module includes a first member having at least one first conductive lead disposed therein and a dielectric portion coupled to an end portion of the at least one first conductive lead, and a second member having at least one second conductive lead disposed therein. The first and second members are coupled such that respective end portions of the first and second conductive leads are operatively positioned and spaced apart by the dielectric portion. The dielectric portion is adapted to capacitively couple the respective end portions of the first and second conductive leads and to allow signals to be transmitted therethrough.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for capacitively-coupled device input/output. Many specific details of certain embodiments of the invention are set forth in the following description and in FIGS. 1–4 to provide a thorough understanding of such embodiments. One skilled in the art, however, will understand that the present invention may have additional embodiments, or that the present invention may be practiced without several of the details described in the following description.

Figure 1:
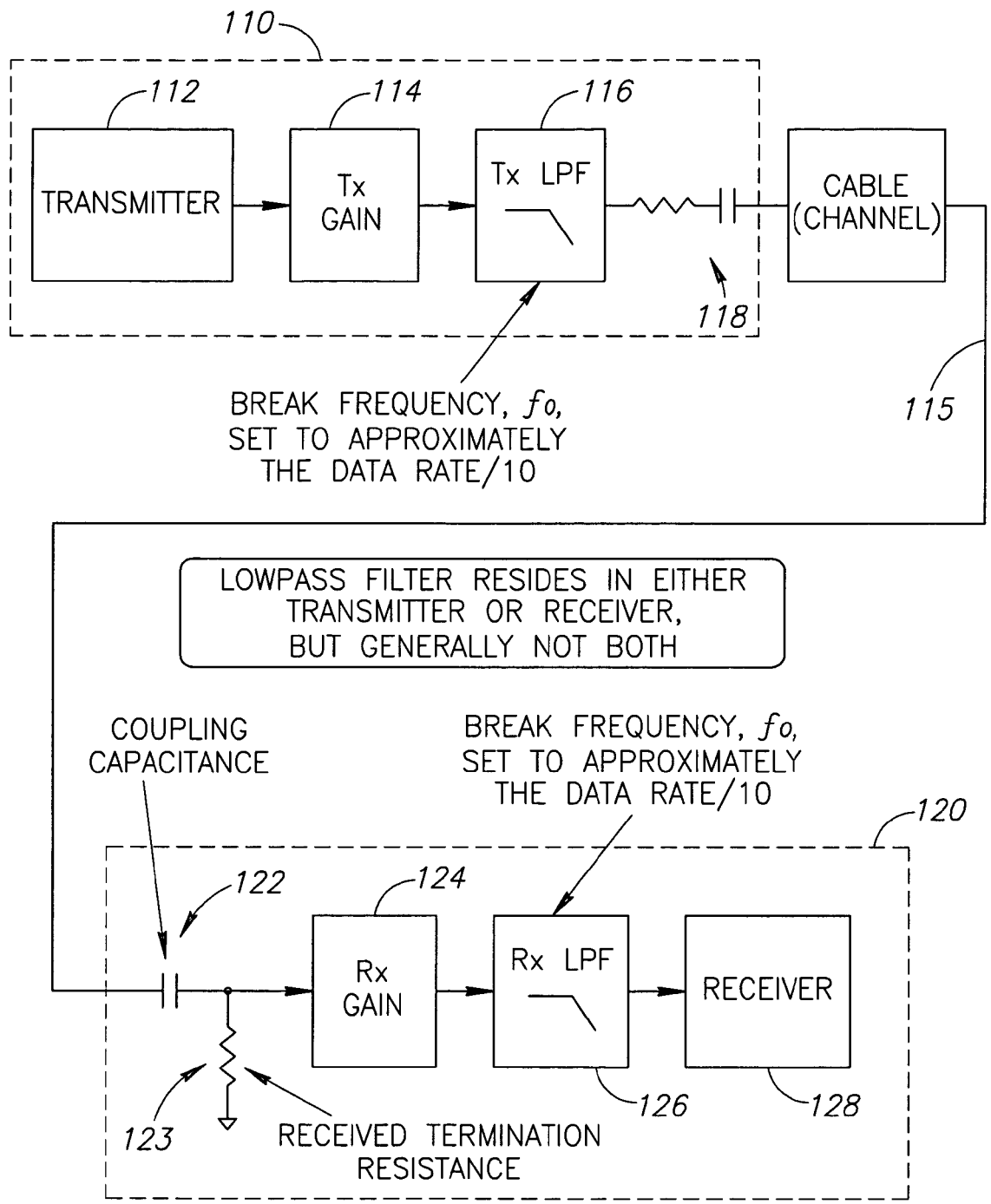
FIG. 1 is a schematic view of an electronic system including a capacitively-coupled receiver in accordance with an embodiment of the present

FIG. 1 is a schematic view of an electronic system 100 including a capacitively-coupled receiver in accordance with an embodiment of the present invention. In this embodiment, the electronic system 100 includes a transmitter module 110 coupled to a receiver module 120 by a conductive lead 115 (e.g. a cable). The transmitter module 110 includes a transmitter 112 coupled to a transmitter gain 114 which is, in turn, operatively coupled to a low-pass filter 116. The transmitter module 110 is operatively coupled to the conductive lead 115 by a transmitter capacitive coupling 118.

Similarly, the receiver module 120 is operatively coupled to the conductive lead 115 by a receiver capacitive coupling 122 which is, in turn, operatively coupled to a receiver gain 124. A receiver termination resistance 123 is coupled between the receiver capacitive coupling 122 and ground. A receiver low-pass filter 126 is coupled between the receiver gain 124 and a receiver 128.

It will be appreciated that in some embodiments of apparatus and methods in accordance with the invention having very small capacitances, attenuation of signal within a passband may occur, and may even be significant. To compensate for this possibility, signal processing in the transmitter module and/or receiver module (but usually not both) may be used, as described above and shown in FIG. 1. Thus, in most electronic systems 100 in accordance with the invention, a low-pass filter typically resides in either the transmitter module or the receiver module, but usually not both.

Apparatus and methods in accordance with the present invention may provide advantages over prior art devices. For example, because the conductive leads are capacitively coupled, the connections may be less susceptible to interference due to dust, debris, or other substances. Therefore, apparatus and methods in accordance with the present invention may provide more robust performance, and improved operational capability in harsh operating environments.

Figure 2:
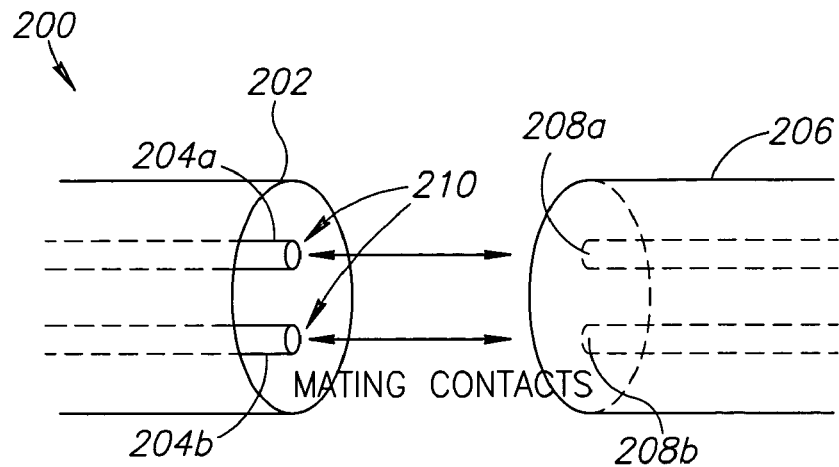
FIG. 2 is a side elevational view of a capacitive coupling in accordance with another embodiment of the present invention.

FIG. 2 is a side elevational view of a capacitive coupling unit 200 in accordance with another embodiment of the present invention. In this embodiment, the capacitive coupling 200 includes a first member 202 having a pair of first conductive leads 204a, 204b. Similarly, a second member 206 includes a pair of second conductive leads 208a, 208b adapted to align with the first conductive leads 204a, 204b.

The leads 204, 208 may be copper, aluminum, gold, or any other suitable conductive material. As further shown in FIG. 2, a dielectric portion 210 is disposed on the ends of the first conductive leads 204a, 204b.

In operation, the first and second members 202, 206 are engaged such that the first and second conductive leads 204, 208 are operatively aligned with the dielectric portions 210 positioned between each respective first and second conductive leads 204, 208. The dielectric portions 210 form a capacitive coupling between each of the aligned first and second conductive leads 204, 208. Thus, data signals are capacitively transmitted from the first conductive leads 204 across the dielectric portions 210 to the second conductive leads 208 (and vice versa). Because the first and second conductive leads 204, 208 are capacitively coupled, there is no contact between the faces of the ends of the leads 204, 208. Thus, dust, debris, and other contaminants that may pose a problem for typical copper and fiber-optic based systems may have little or no impact on the operability of the capacitive coupling unit 200.

It will be appreciated that for modern data I/O applications, signals are typically high-speed (e.g. at least 1 Gbps), spectrally-shape (e.g. Manchester or 8B10B-encoded), and serial. Because of this, relatively small capacitances may provide sufficient coupling of the signal. Thus, methods and apparatus in accordance with the present invention may successfully provide good coupling performance with very small capacitances (e.g. less than or equal to 1 pF). Capacitance is given by the following Equation (1):

$$C = \kappa \in_o A/d \quad (1)$$

where $\kappa$ is the dielectric constant (typically $1 < \kappa < 10$), $\in_o$ is the permittivity of space (e.g 8.8 pF/m), A is the area of the conductor pads, and d is the distance separating the pads.

Thus, referring to the embodiment of the capacitive coupling unit 200 described above and shown in FIG. 2, in one particular embodiment, it may be assumed that the conductive leads 204, 208 are size 12 leads having a 2.4 mm O.D., as a typical moderate-sized contact specified in MIL-C-38999 connectors, and assuming a thickness of the dielectric portion 210 of 1 mm having a dielectric constant of $\kappa=3.0$ deposited on the ends of the first conductive leads 204 (or alternately, dielectric portions of 0.5 mm thickness disposed on the ends of both the first and second conductive leads 204, 208), then the capacitance may be computed using Equation (1) as C=0.12 pF.

Generally, for capacitively-coupled connections in accordance with the present invention, the coupling may typically appear to be high-pass, so that higher frequencies are transmitted with higher amplitude than lower frequencies. For large enough capacitances, for example, capacitances of at least 10 pF or more, for the 1 Gbps example given above, and with signal formats that have no low-frequency content, such as 8B10B and Manchester encoded signals, the effect of the capacitive coupling may be minimal.

Figure 3:
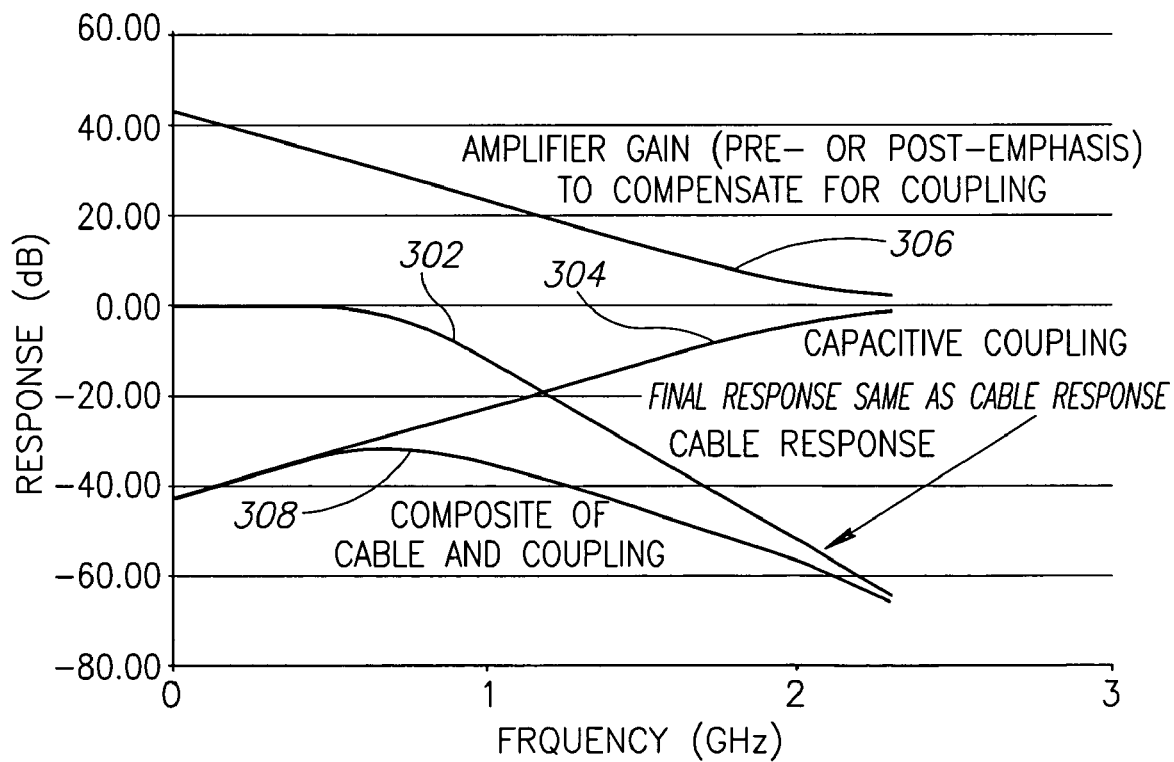
FIG. 3 is a graph showing transfer functions of various components within a system in accordance with a further embodiment of the invention.

FIG. 3 is a graph 300 showing transfer functions of various components within a system in accordance with a further embodiment of the invention. More specifically, the graph 300 shows a first transfer function 302 of an ordinary cable response, a second transfer function 304 of a capacitive coupling response, a third transfer function 306 of an amplifier gain (pre- or post-emphasis) to compensate for the capacitive coupling, and a fourth transfer function 308 of a composite of the cable and capacitive coupling responses. One may note that the final response of the fourth transfer function 308 for the composite of the cable and capacitive coupling responses may be very similar to the first transfer function 302 of the cable response at the higher frequencies of primary interest in signal communications.

As noted above, because the capacitive coupling may create a highpass filter transfer function, a compensating lowpass filter effect in the transmitter and/or receiver may be used. In some embodiments, the lowpass break frequency can be set at about 1/10 the data rate, since there may be little energy at frequencies below this point in either 8B10B or Manchester encoded signals.

Figure 4:
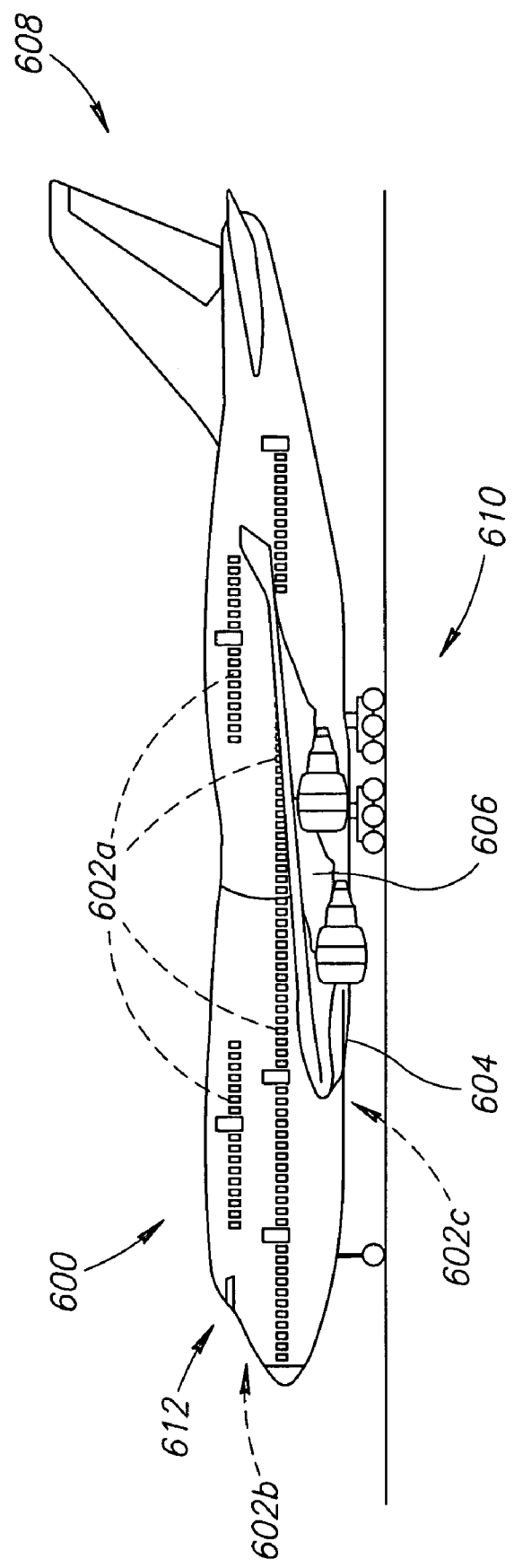
FIG. 4 is a side elevational view of an aircraft having one or more electronic systems or system components in accordance with yet another embodiment of the present invention.

It will be appreciated that a wide variety of apparatus may be conceived that include electronic systems having capacitively coupled connections in accordance with alternate embodiments of the present invention, and the invention is not limited to the particular embodiments described above and shown in FIGS. 1–3. For example, FIG. 4 is a side elevational view of an aircraft 600 having one or more electronic systems or system components 602 in accordance with yet another embodiment of the present invention. In general, except for the various capacitively coupled connections 602, the various components and subsystems of the aircraft 600 may be of known construction and, for the sake of brevity, will not be described in detail herein.

As shown in FIG. 4, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. The aircraft 600 shown in FIG. 4 is generally representative of a commercial passenger aircraft, including, for example, the 737, 747, 757, 767, and 777 models commercially-available from The Boeing Company. The inventive apparatus and methods disclosed herein, however, may also be employed in any other types of aircraft, such as rotary aircraft or manned military aircraft, including those described, for example, in The Illustrated Encyclopedia of Military Aircraft by Enzo Angelucci, published by Book Sales Publishers, September 2001.

More specifically, the aircraft 600 may include one or more embodiments of optical systems 602a in accordance with the present invention that operate at connections across bulkheads within the airframe and/or fuselage of the aircraft structure. Similarly, the aircraft 600 may include one or more capacitively coupled connections 602b incorporated into the flight control system 612, the control system for the propulsion units 604, the control system for the tail assembly 608, and the control system for the landing gear 610. Alternately, capacitively coupled connections may be incorporated into virtually any desirable sub-system or sub-system component, including, for example, power control and monitoring systems of the type generally disclosed by U.S. Pat. No. RE37,182 issued to Fasullo et al., high-speed data communication circuits of the type generally disclosed by U.S. Pat. No. 6,081,430 issued to La Rue, signal management and control systems of the type disclosed by U.S. Pat. No. 6,611,526 B1 issued to Chinnaswamy et al., and for coupling processor modules as generally taught by U.S. Pat. No. 6,640,272 B1 issued to Hartwell et al. Clearly, a wide variety of optical systems 602 in accordance with embodiments of the present invention may be conceived for incorporation into the various subsystems of the aircraft 600.

While preferred and alternate embodiments of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An electronic system, comprising:
   a signal lead;
   a communications module including at least one of a transmitter module configured to transmit a data signal and a receiver module adapted to receive a data signal, wherein the transmitter module comprises a transmitter coupled to a first gain, and a first low-pass filter coupled between the first gain and the signal lead, and wherein the receiver module comprises a receiver coupled to a second low-pass filter, and a second gain coupled between the second low-pass filter and the signal lead; and
   a capacitive coupling module coupled between the communications module and the signal lead, the capacitive coupling module including
      a first member having at least one first conductive lead disposed therein and a dielectric portion coupled to an end portion of the at least one first conductive lead; and
      a second member having at least one second conductive lead disposed therein, the first and second members being coupled such that respective end portions of the first and second conductive leads are operatively positioned and spaced apart by the dielectric portion, the dielectric portion being configured to capacitively couple the respective end portions of the first and second conductive leads and to allow signals to be at least one of transmitted and received therethrough.

2. The electronic system of claim 1, wherein the dielectric portion comprises a first dielectric portion, further comprising a second dielectric portion coupled to the end portion of the at least one second conductive lead.

3. The electronic system of claim 1, wherein the at least one first conductive lead includes a pair of first conductive leads having a corresponding pair of dielectric portions coupled to end portions thereof, and wherein the at least one second conductive lead includes a pair of second conductive leads.

4. The electronic system of claim 1, wherein the first and second conductive leads comprise size 12 leads, and wherein the thickness of the dielectric portion is approximately 1 mm, and wherein the dielectric portion has a dielectric constant of approximately three.

5. The electronic system of claim 1, wherein the at least one first conductive lead includes a pair of first conductive leads having a corresponding first pair of dielectric portions coupled to end portions thereof, and wherein the at least one second conductive lead includes a pair of second conductive leads having a corresponding second pair of dielectric portions coupled to end portions thereof, wherein the first and second pairs of conductive leads comprise size 12 leads, and wherein the thickness of the first and second dielectric portions is approximately 0.5 mm, and wherein the first and second dielectric portions have a dielectric constant of approximately three.

6. An aerospace vehicle, comprising:
   a fuselage;
   a propulsion system operatively coupled to the fuselage; and
   an electronic system disposed within the fuselage and including
      a signal lead;
      a communications module including at least one of a transmitter module configured to transmit a data signal and a receiver module adapted to receive a data signal, wherein the transmitter module comprises a transmitter coupled to a first gain, and a first low-pass filter coupled between the first gain and the signal lead, and wherein the receiver module comprises a receiver coupled to a second low-pass filter, and a second gain coupled between the second low-pass filter and the signal lead; and
      a capacitive coupling module coupled between the data communications module and the signal lead, the capacitive coupling module including
         a first member having at least one first conductive lead disposed therein and a dielectric portion coupled to an end portion of the at least one first conductive lead; and
         a second member having at least one second conductive lead disposed therein, the first and second members being coupled such that respective end portions of the first and second conductive leads are operatively positioned and spaced apart by the dielectric portion, the dielectric portion being adapted to capacitively couple the respective end portions of the first and second conductive leads and to allow signals to be at least one of transmitted and received therethrough.

7. The aerospace vehicle of claim 6, wherein the electronic system is operatively coupled to the propulsion system.

8. The aerospace vehicle of claim 6, further comprising a flight control system disposed within the fuselage, and wherein the electronic system is operatively coupled to the flight control system.

9. The aerospace vehicle of claim 6, wherein the dielectric portion comprises a first dielectric portion, further comprising a second dielectric portion coupled to the end portion of the at least one second conductive lead.

10. The aerospace vehicle of claim 6, wherein the at least one first conductive lead includes a pair of first conductive leads having a corresponding pair of dielectric portions coupled to end portions thereof and wherein the at least one second conductive lead includes a pair of second conductive leads.

11. The aerospace vehicle of claim 6, wherein the first and second conductive leads comprise size 12 leads, and wherein the thickness of the dielectric portion is approximately 1 mm, and wherein the dielectric portion has a dielectric constant of approximately three.

12. A method of transmitting signals, comprising:
   providing a signal lead;
   providing a communications module including providing at least one of a transmitter module adapted to transmit a data signal and a receiver module adapted to receive a data signal, wherein providing the transmitter module include providing a transmitter coupled to a first gain, and providing a first low-pass filter coupled between the first gain and the signal lead, and wherein providing the receiver module comprises providing a receiver coupled to a second low-pass filter, and providing a second gain coupled between the second low-pass filter and the signal lead;
   providing a capacitive coupling module coupled between the data communications module and the signal lead; and capacitively transmitting the data signal between the communications module and the signal lead.

13. The method of claim 12, wherein providing a capacitive coupling module includes:

providing a first member having at least one first conductive lead and a dielectric portion coupled to an end portion of the at least one first conductive lead; and providing a second member having at least one second conductive lead, the first and second members being coupled such that respective end portions of the first and second conductive leads are operatively positioned and spaced apart by the dielectric portion, the dielectric portion being configured to capacitively couple the respective end portions of the first and second conductive leads and to allow signals to be at least one of transmitted and received therethrough.

14. The method of claim 13, wherein the dielectric portion comprises a first dielectric portion, further comprising a second dielectric portion coupled to the end portion of the at least one second conductive lead.

15. The method of claim 13, wherein the at least one first conductive lead includes a pair of first conductive leads having a corresponding pair of dielectric portions coupled to end portions thereof, and wherein the at least one second conductive lead includes a pair of second conductive leads.

16. The method of claim 13, wherein the first and second conductive leads comprise size 12 leads, and wherein the thickness of the dielectric portion is approximately 1 mm, and wherein the dielectric portion has a dielectric constant of approximately three.

* * * * *